(12) United States Patent
Szeto

(10) Patent No.: US 8,727,566 B1
(45) Date of Patent: May 20, 2014

(54) ASSEMBLY AND METHOD FOR RETROFITTING LED LIGHTS INTO A FLUORESCENT BULB CEILING FIXTURE

(76) Inventor: Oliver Szeto, Bensalem, PA (US)

( * ) Notice: Subject to any disclaimer, the term of this patent is extended or adjusted under 35 U.S.C. 154(b) by 193 days.

(21) Appl. No.: 13/245,809

(22) Filed: Sep. 26, 2011

(51) Int. Cl.
*F21V 1/00* (2006.01)

(52) U.S. Cl.
USPC .................. 362/235; 362/249.1; 362/249.02; 362/800; 29/825

(58) Field of Classification Search
USPC ......... 29/825, 592.1; 262/217, 225, 235, 240, 262/243, 800
See application file for complete search history.

(56) References Cited

U.S. PATENT DOCUMENTS

| | | | | |
|---|---|---|---|---|
| 5,276,591 A * | 1/1994 | Hegarty | ...................... | 362/601 |
| 6,283,612 B1 * | 9/2001 | Hunter | ......................... | 362/240 |
| 6,739,734 B1 * | 5/2004 | Hulgan | ......................... | 362/243 |
| 8,556,458 B2 * | 10/2013 | Higuchi et al. | ............... | 362/235 |
| 2007/0228999 A1 * | 10/2007 | Kit | ................................... | 315/291 |
| 2008/0253122 A1 * | 10/2008 | Hancock et al. | .............. | 362/251 |
| 2009/0046457 A1 * | 2/2009 | Everhart | ........................ | 362/235 |
| 2010/0148673 A1 * | 6/2010 | Stewart et al. | ................. | 315/121 |
| 2011/0084608 A1 * | 4/2011 | Lin et al. | .......................... | 315/77 |
| 2011/0121756 A1 * | 5/2011 | Thomas et al. | ............... | 315/294 |
| 2012/0161666 A1 * | 6/2012 | Antony et al. | ................. | 315/294 |

* cited by examiner

*Primary Examiner* — Minh Trinh
(74) *Attorney, Agent, or Firm* — LaMorte & Associates P.C.

(57) ABSTRACT

A system and method of converting a light fixture from a fluorescent light fixture to an LED light fixture. Originally, the fluorescent light fixture has a sheet metal troffer, a fluorescent light power supply, and receptacles for retaining fluorescent tube lights. The conversion is accomplished in the following manner. A circuit board assembly is provided that has a plurality of LEDs mounted thereon. An LED power supply is also provided, as is thermally conductive adhesive. The fluorescent light power supply is removed from the light fixture and the LED power supply is installed in its place. The circuit board assembly is directly mounted to the sheet metal troffer with thermally conductive adhesive. The circuit board assembly is then connected to the LED power supply and the light fixture is ready for use.

15 Claims, 3 Drawing Sheets

ASSEMBLY AND METHOD FOR RETROFITTING LED LIGHTS INTO A FLUORESCENT BULB CEILING FIXTURE

BACKGROUND OF THE INVENTION

1. Field of the Invention

In general, the present invention relates to ceiling/overhead lighting fixtures that utilize sheet metal troffers. More particularly, the present invention relates to systems and methods that retroactively add LED lights to the structure of a lighting fixture that previously held a fluorescent bulb or an incandescent bulb.

2. Prior Art Description

Light emitting diodes (LEDs) are becoming more powerful with each successive generation. At the same time, the costs associated with manufacturing LEDs has been decreasing. LEDs have now evolved to a point where a small matrix of LEDs can produce just as much light as an incandescent bulb or a fluorescent bulb. As an example, a small matrix of LEDs that uses less than ten watts during operation can give off more light than a 100-watt incandescent bulb or a 40-watt fluorescent tube.

LEDs are far more energy efficient than either incandescent bulbs or fluorescent bulbs. Furthermore, LEDs have a much longer life span and are far more resistant to damage than are incandescent bulbs and fluorescent bulbs. For these reasons, many companies would like to replace traditional incandescent light bulbs and fluorescent bulbs with LED lighting. However, a problem that occurs is that in many offices, general lighting is installed as ceiling/overhead fixtures that can only retain fluorescent tube lighting. The ceiling/overhead fixtures are either set into the structure of drop ceiling tiles or are suspended from the structure of the ceiling.

Ceiling/overhead fixtures typically have sheet metal troffers that receive, hold, and power florescent tubes. In order to replace the florescent tubes with LED lights, either the ceiling/overhead fixtures have to be replaced, or the ceiling/overhead fixtures have to be modified to receive and power a matrix of LEDs.

Replacing existing ceiling/overhead fixtures is a very expensive and labor intensive endeavor that may require the ceiling tiles surrounding the troffers be replaced. This solution is very expensive and it would take many years for the cost savings of the LED lights to pay for the cost of the lighting change. As a consequence, outside of new construction, there is no commercial significant market for LED lighting fixtures that replace fluorescent tube troffers.

An alternative approach is to convert existing fluorescent ceiling troffers into receptacles for LED matrices. In order to convert a fluorescent light troffer into an appropriate LED receptacle, certain modifications of the troffer must be made. In the prior art, there exist some conversion systems. An exemplary system is the Tempr™ T8LED conversion kit sold by Albeo Technologies of Boulder, Colo. Using such prior art conversion systems, first the power supply and supply wiring within the troffer are replaced. Second, the receptacles that hold the fluorescent tube lights are removed. Third, a long heavy heat sink is screw mounted into the base of the troffer. Lastly, an LED matrix is mounted to the heat sink using mechanical fasteners. Such conversion kits sell in excess of $500 per troffer and require substantial labor to install. Consequently, many companies that would like to convert to LED lighting do not find it cost effective to change from the existing fluorescent tube lighting.

A need therefore exists for a system and method of converting a fluorescent light ceiling fixture into an LED fixture at a lower cost and using less labor than is required by existing conversion systems. In this manner, more businesses and homes will find it cost effect to convert to LED lighting, therein reducing power consumption and the corresponding drain on natural resources. This need is met by the present invention as described and claimed below.

SUMMARY OF THE INVENTION

The present invention is a system and method of converting a light fixture from a fluorescent light fixture to an LED light fixture. Originally, the fluorescent light fixture has a sheet metal troffer, a fluorescent light power supply, and receptacles for retaining fluorescent tube lights. The conversion is accomplished in the following manner. A circuit board assembly is provided that has a plurality of LEDs mounted thereon. An LED power supply is also provided, as is thermally conductive adhesive. The fluorescent light power supply is removed from the light fixture and the LED power supply is installed in its place.

The circuit board assembly is directly mounted to the sheet metal troffer with thermally conductive adhesive. The circuit board assembly is then connected to the LED power supply and the light fixture is ready for use.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be embodied in many ways, the embodiment illustrated shows the system being used to retrofit a traditional 24 inch by 48-inch sheet metal ceiling troffer that was originally designed to hold four fluorescent tubes. Such ceiling troffers are most commonly utilized in the United States. Accordingly, the embodiment is selected in order to set forth the best mode contemplated for the invention. The illustrated embodiment, however, is merely exemplary and should not be considered a limitation when interpreting the scope of the appended claims. It will be understood that the present invention can be applied to ceiling troffers of many different sizes.

Figure 1:
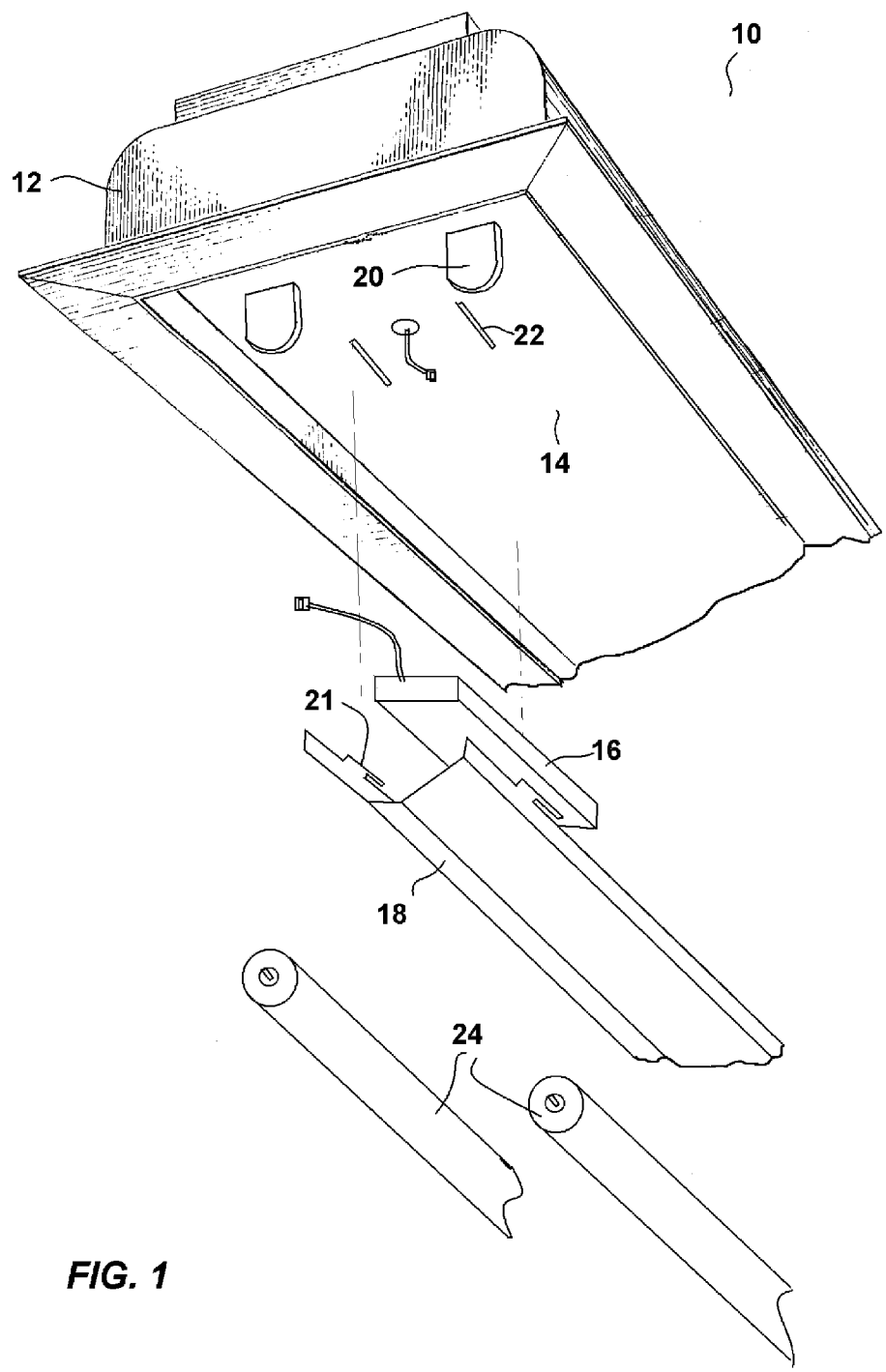
FIG. 1 is a perspective view of a prior art lighting fixture having a sheet metal troffer.

Referring to FIG. 1, a prior art light fixture 10 is shown. The light fixture 10 has a sheet metal troffer 12 that is mounted to a dropped ceiling. The troffer 12 has a flat bottom surface 14.

A power supply 16 and associated wiring 17 is disposed behind a formed metal cover 18 that is mounted to the center of the flat bottom surface 14 of the troffer 12. Normally, the power supply 16 and wiring 17 cannot be seen unless the metal cover 18 is removed. The metal cover 18 typically engages the troffer 12 using interlocking tabs 21 and slots 22. Accordingly, the metal cover 18 can be removed without the use of tools.

Receptacle posts 20 are mounted to the troffer 12 at opposite ends of the bottom surface 14. The receptacle posts 20 contain the electrical contacts that provide power to the florescent tube lights 24. The receptacle posts 20 are spaced to match the predetermined length of the fluorescent tube lights 24, wherein the receptacle posts 20 retain the fluorescent tube lights 24 in fixed positions.

Figure 2:
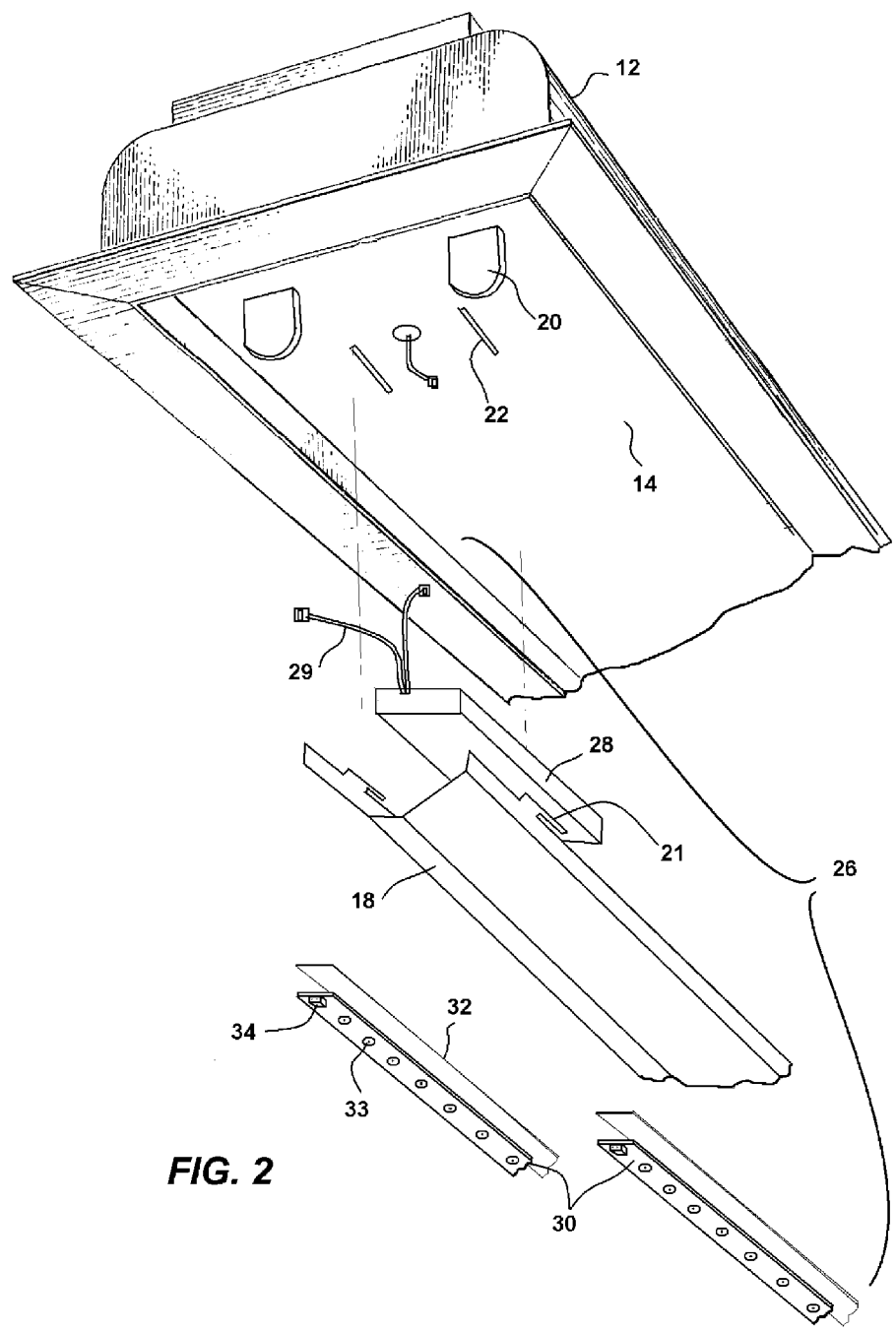
FIG. 2 is an exploded perspective view of a converted light fixture utilizing the sheet metal troffer of FIG. 1.
Figure 3:
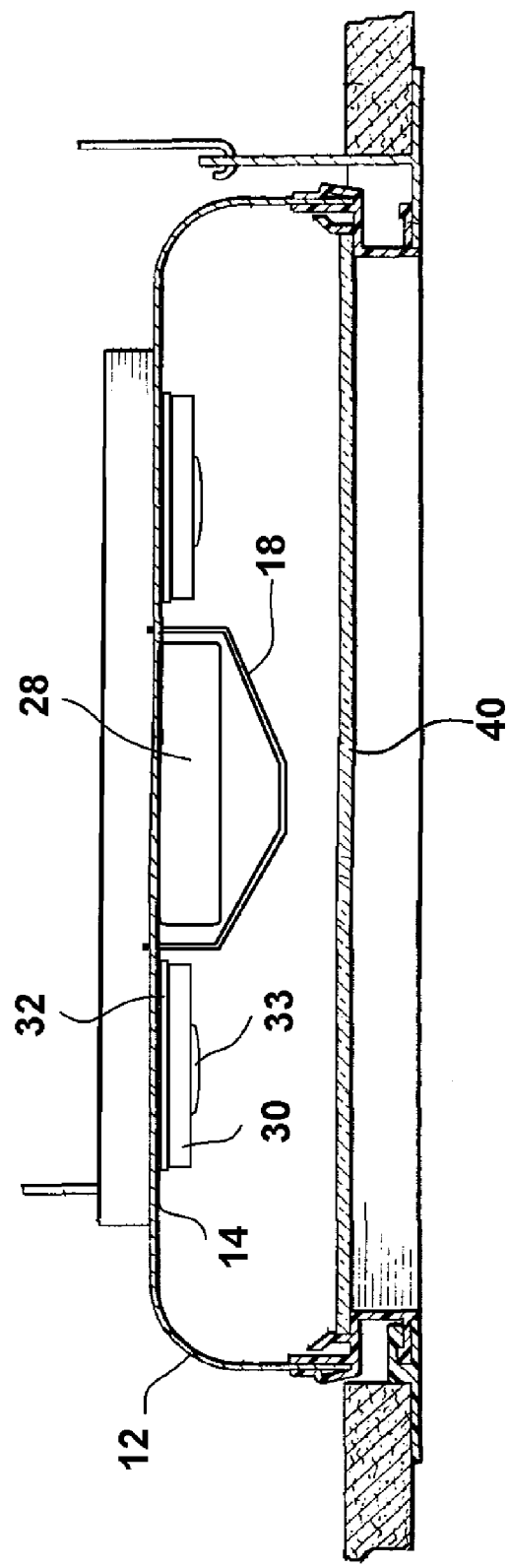
FIG. 3 is a cross-sectional view of the converted light fixture.

Referring to both FIG. 2 and FIG. 3, in conjunction with FIG. 1, it can be seen that in order to prepare the prior art lighting fixture 10 for conversion, the fluorescent tube lights 24 are removed. The metal cover 18 is removed, as are the original power supply 16 and wiring 17. The receptacle posts 20 can be removed if desired, but need not be.

The present invention conversion system 26 includes a new LED power supply 28 with new attachment wiring 29. This new LED power supply 28 and wiring 29 is substituted for the original power supply 16 and original wiring 17. After the exchange is made, the metal cover 18 is returned to its installed position on the troffer 12.

A plurality of circuit board assemblies 30 are provided. In the illustrated embodiment, two circuit board assemblies 30 are shown. However, four circuit board assemblies can be used to mimic the lighting profile of a four bulb fluorescent lighting fixture.

Each of the circuit board assemblies 30 contains a matrix of LEDs 33. The LEDs 33 are preferably linearly aligned along the length of the circuit board assembly 30. Each circuit board assembly 30 has a length which is approximately the same length as the fluorescent tube lights 24 originally used. An electrical connector 34 is provided on each of the circuit board assemblies 30 for use in connecting electrical power to the circuit board assemblies 30.

A thermally conductive adhesive is used to hold the circuit board assemblies 30 in place. The preferred thermally conductive adhesive is a length of thermally conductive tape 32. A length of thermally conductive tape 32 is provided for each of the circuit board assemblies 30. The adhesive tape 32 is applied to the bottom of each of the circuit board assemblies 30 and the circuit board assemblies 30 are adhered directly to the bottom surface 14 of the troffer 12. The troffer 12 is fabricated from sheet metal. The metal of the troffer 12 acts as a heat sink that absorbs heat from the circuit board assemblies 30 and transfers that heat to the sheet metal of the troffer 12. Due to the large surface area of the troffer 12 in relation to the relatively small area of the circuit board assemblies 30, enough heat is transferred to keep the circuit board assemblies 30 within their operating temperature specifications even during the most unfavorable ambient conditions.

Once the circuit board assemblies 30 are affixed in place using the thermally conductive tape 32, the power wiring 29 is attached to the connectors 34 on the circuit board assemblies 30. The lighting fixture 10 is then ready to use.

The lighting fixture 10 may come with a diffuser panel. The original diffuser panel can be reused once the conversion is complete. However, in a preferred embodiment a specialized diffuser panel 40 is provided. The specialized diffuser panel 40 diffuses light in a manner that the individual LEDs 33 do not appear as spots of light, but rather appear as a continuous line of light. In this manner, the diffuser panel 40 can cause the LEDs 30 to present the same appearance as would a conventional fluorescent tube.

It will now be understood that the methodology of converting a preinstalled fluorescent light fixture to an LED light fixture involves the following steps. Step one, disconnect power from the fixture and remove the diffusion panel, if present. Step two, remove the fluorescent tube lights 24 and remove the power supply 16 from the light fixture 10. Step three, install the new LED power supply 28 and associated wiring 29. Step four, adhere circuit board assemblies 30 directly to the troffer 12 with a thermally conductive adhesive. Step five, connect the LED power supply 16 to the circuit board assemblies 30. Lastly, reinstall or replace the diffuser panel 40. The conversion is simple and requires nothing more than a screwdriver to remove the old power supply 16 and replace it with the new LED power supply 28. Furthermore, aside from the simplicity of installation, the use of parts is minimized. No auxiliary heat sink is used. Rather, the existing metal of the troffer 12 is used as the heat sink. Since no auxiliary heat sink is needed, no heat sink need be manufactured and/or installed. The result is a system that is both inexpensive to manufacture and easy to install.

The cost and labor advantages also extend to repairs. If any circuit board assembly 30 were to fail once installed, a repair can be rapidly made without the use of any tools. A replacement circuit board assembly can simply be adhered to the bottom surface 14 of the troffer 12 adjacent the failed circuit board assembly. The power wiring 29 is then simply moved from the failed circuit board assembly to the replacement circuit board assembly. The failed circuit board assembly can be left in place. Accordingly, a broken light fixture can be rapidly repaired with only a small effort of labor.

The ability to adhere circuit board assemblies directly to the sheet metal of a troffer 12, also enables a user to customize the light emitted by a particular light fixture. Any plurality of circuit board assemblies 30 can be adhered to the troffer 12, provided there is space available. Accordingly, the light fixture can be made as bright or as dim as desired. Through the power supply 28, dimming of the LEDs is becomes possible using a dimmer switch or other dimmer control. Such control cannot be readily achieved with fluorescent tubes. Furthermore, circuit board assemblies with colored LEDs can be added to a light fixture to tint or soften the light being emitted.

Ceiling light fixtures that hold fluorescent tube lights typically hold either two tube lights or four tube lights. This produces either two or four strips of light when the tube lights are on and are viewed through a diffuser. It should be understood that the present invention can mimic the same look by using either two or four circuit board assemblies 30 in the lighting fixture.

It will be understood that the embodiment of the present invention that is illustrated and described is merely exemplary and that a person skilled in the art can make many variations to that embodiment. For instance, the length and number of circuit board assemblies 30 can be varied, as can the number and type of LEDs 33 on any circuit board assembly 30. All such embodiments are intended to be included within the scope of the present invention as defined by the claims.

What is claimed is:

1. A method of converting a light fixture from a fluorescent light fixture to an LED light fixture, wherein the fluorescent light fixture has a sheet metal troffer, a fluorescent light power supply and receptacles for retaining fluorescent tube lights, said method comprising the steps of:

providing a circuit board assembly that has a first surface and an opposite second surface, wherein a plurality of LEDs are mounted to said first surface, and wherein said plurality of LEDs produce heat when activated;

providing an LED power supply;

providing a length of thermally conductive tape;

removing said fluorescent light power supply from said light fixture;

installing said LED power supply into said light fixture;

mounting second surface of said circuit board assembly flush against said sheet metal troffer with said length of thermally conductive tape, wherein said sheet metal troffer serves as a heat sink that conducts said heat away from said plurality of LEDs through said length of thermally conductive tape when plurality of LEDs are activated; and connecting said circuit board assembly to said LED power supply.

2. The method according to claim 1, further including the step of removing said receptacles from said light fixture.

3. The method according to claim 1, wherein said LED power supply has connector leads and said circuit board assembly has a connector, wherein said step of connecting said circuit board assembly to said LED power supply includes connecting said connector leads to said connector.

4. A method of converting a light fixture from a fluorescent light fixture to an LED light fixture, wherein the fluorescent light fixture has a sheet metal troffer, a fluorescent light power supply and receptacles for retaining fluorescent tube lights of a predetermined length, said method comprising the steps of:

providing a plurality of circuit board assemblies, wherein each of said circuit board assemblies has a first surface and an opposite second surface, wherein an array of LEDs are mounted to said first surface;

providing an LED power supply;

removing said fluorescent light power supply from said light fixture;

installing said LED power supply into said light fixture;

mounting said second surface of said circuit board assemblies flush against said sheet metal troffer with a length of thermally conductive tape, wherein said sheet metal troffer serves as a heat sink and conducts heat away from said circuit board assemblies; and connecting said circuit board assemblies to said LED power supply.

5. The method according to claim 4, further including the step of removing said receptacles from said light fixture.

6. The method according to claim 4, wherein each of said circuit board assemblies has a length generally equal to said predetermined length.

7. The method according to claim 4, wherein said LED power supply has connector leads and said circuit board assemblies have connectors, wherein said step of connecting said circuit board assemblies to said LED power supply includes connecting said connector leads to said connectors.

8. The method according to claim 4, wherein each of said circuit board assemblies contains an identical matrix of LEDs.

9. The method according to claim 8, wherein at least one of said circuit board assemblies contains at least one LED dissimilar in color from others on said circuit board assemblies.

10. The method according to claim 4, further including the step of providing a diffuser panel that diffuses light from said matrix of LEDs causing said matrix of LEDs to appear as a continuous line of light.

11. A method of converting a light fixture from a fluorescent light fixture to an LED light fixture, wherein said fluorescent light fixture has a sheet metal troffer, a fluorescent light power supply and receptacles that retain fluorescent tube lights of a predetermined length in multiple predetermined positions, said method comprising the steps of:

providing a plurality of circuit board assemblies, wherein each of said circuit board assemblies has an array of LEDs mounted thereon, and wherein each of said circuit board assemblies has a length generally equal to said predetermined length;

providing an LED power supply;

removing said fluorescent light power supply from said light fixture;

installing said LED power supply into said light fixture;

mounting said circuit board assemblies flush against said sheet metal troffer under said predetermined positions with thermally conductive tape, wherein said sheet metal troffer serves as a heat sink and conducts heat away from said circuit board assemblies; and connecting said circuit board assemblies to said LED power supply.

12. The method according to claim 11, further including the step of removing said receptacles from said light fixture.

13. The method according to claim 11, wherein said LED power supply has connector leads and said circuit board assemblies have connectors, wherein said step of connecting said circuit board assemblies to said LED power supply includes connecting said connector leads to said connectors.

14. The method according to claim 11, wherein each of said circuit board assemblies contains an identical matrix of LEDs.

15. The method according to claim 11, wherein at least one of said circuit board assemblies contains at least one LED dissimilar in color from others on said circuit board assemblies.

\* \* \* \* \*